United States Patent Office 3,502,713
Patented Mar. 24, 1970

3,502,713
PRODUCTION OF NONIONIC LOW-FOAMING EMULSIFIERS
Keith Liddell Johnson, Matteson, Ill., assignor to Swift & Company, Chicago, Ill., a corporation of Delaware
No Drawing. Filed Apr. 8, 1966, Ser. No. 541,134
Int. Cl. B01f 17/36; C07c 69/78, 69/34
U.S. Cl. 260—477    9 Claims

ABSTRACT OF THE DISCLOSURE

Surface active compositions and methods for preparing same comprising mixing together a dibasic acid, an aromatic carboxylic acid, and a di-acylatable reactant; and heating the resulting mixture so as to effect a condensation reaction between the di-acylatable reactant and the two dissimilar acylating reactants.

---

The present invention relates to new compounds useful as improved surface active agents and to their method of preparation.

Over the past two decades, the use of nonionic surface active agents as emulsifiers, wetting agents, penetrants, etc., has gained wide industrial and domestic acceptance because of their effectivenes and insensitivity to hard water, alkalis, acids, and other chemical systems. However, the application of these materials has in many instances been limited by the tendency of most, if not all, of these compounds to foam a great deal particularly when the hydrophilic and lipophilic portions are so balanced as to produce the optimum deterging and emulsifying properties. For this reason, these materials have gained only limited acceptance in fields such as power spray washing, aqueous gas and fume scrubbing, paint spray collecting, and other systems where the primary operation is accomplished by, or attained with, a high degree of agitation. Thus, it would be greatly desired by the industry if it were possible to employ nonionic surface active agents which would produce the heretofore desired properties while possessing low foaming tendencies which would free these compounds from the objectionable properties caused by high foaming.

Therefore, it is an object of the present invention to provide improved compounds which are suitable as surface active agents.

It is a further object of the present invention to provide surface active compounds which have low foaming tendencies.

It is a further object of the present invention to provide a method for producing effective surface active agents which have low foaming properties.

Additional objects if not specifically set forth herein will be readily apparent to those skilled in the art from the following detailed description of the invention.

In general, the compounds of the present invention may be described as the reaction products of an aromatic carboxylic acid with a dibasic acid and a diacylatable material having at least one and, preferably, two acylatable amino groups. In their preparation, the three aforementioned reactants are mixed in a suitable container and subjected to time and temperature conditions sufficient to obtain the desired reaction.

Suitable aromatic carboxylic acids useful in the present invention may be generally designated as the benzene and naphthalene carboxylic acids as well as the halides and lower aliphatic esters thereof. Specific compounds suitable in the present invention include benzoic acid, o-toluic acid, naphthenic acid, and m-toluic acid.

The aforementioned dibasic acids may be generally described as the aliphatic dibasic acids having from 2 to 10 carbon atoms inclusive of the carbon atoms in the carboxylic acid groups. Compounds falling within this description include maleic, succinic, sebacic, adipic and malic acids. The anhydrides of maleic and succinic acid are particularly well suited sources of acid, providing the acylatable materials are so selected that they are incapable of cyclic imide formation.

Falling within the class of acylatable substances used in the present invention are the aliphatic damines and monoalkanolamines having from 2 to 6 carbons. In addition, certain polyamines which contain up to two secondary amino groups in addition to two primary amino groups are also suitable. Compounds falling within this latter group are the aliphatic tri- and tetramines which are susceptible to imidazoline ring formation, e.g., diethylene triamine, triethylene tetramine, dipropylene triamine and tetraethyline pentamine. Also, one may use the alkylol amines analogous to the other aforementioned amines.

While the above definitions of the dibasic acids and acylatable substances encompass the compounds suitable in this invention, these definitions must be restricted by the proviso that the total number of carbon atoms present in the dibasic acid and the diamine fall within the range of 4–18 inclusive, and preferably 6–12 inclusive. When the total number of carbon atoms of these two reactants fall without these ranges, the suitability of the prepared compounds as surface active agents undergoes a marked decrease.

In summation of the above information, the compounds of the present invention conform to the following formula:

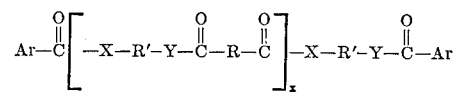

wherein, X=1–6; Ar=benzene, naphthalene and substituted radicals thereof; R′=aliphatic dialkyleneimine and divalent cyclic amidine radicals; R+R′=groups containing a total of 2–16 carbon atoms; and X and Y are selected from the group consisting of O, NH, and NR″, where R″ is a lower aliphatic radical of up to 3 carbon atoms, with at least one of X and Y being selected from the group consisting of NH and NR″.

Depending upon the total molecular weight of the compounds prepared, the molar ratios of the various reactants may be varied within certain limits. In this regard, the ratio of aromatic carboxylic acid to dibasic acid may be varied from 1:0.5 to 1:6, and preferably within the ratio of 1:1 to 1:3. In addition, the acylatable reactant and dibasic acid should be in a ratio of approximately 1:1 for optimum yield. However, either of these latter reactants may be present in an excess without affecting the present reaction.

The products of the present invention are in general formed by heating the above reactants to cause an amide linkage between the amine reactant and the two dissimilar acylating agents, thus forming a linear polyamide terminated by aroyl groups. The specific compound formed in a given reaction will vary to a degree depending upon the reaction conditions employed. Of course, one will realize that use of a monoalkylolamine in the present reaction will result in one amide linkage and one ester linkage.

Generally speaking, heating of the above reactants at a temperature within the range of from about 120 to about 160° C. results in the reaction of the amine groups of the acylatable reactant with the carboxyl groups of the acylating agents.

When compounds such as diethylene triamine, triethylene tetramine and aminoethyl ethanolamine are employed as the acylatable reactant in the present invention, reaction at temperatures above 160° C., e.g., about 170 to about 210° C., results in formation of cyclic imidazoline type materials. Because of this reaction, these materials result in but two acylatable centers for the purposes of the present process. Regardless of the amine consituent involved, optimum reaction conditions for the present process involves heating of the materials at a temperature of from about 145° C. for 2 hours followed by heating at 185° C. for 2 hours followed by stripping of excess volatile materials. The heating at the initial lower temperature permits coupling of the more volatile lower molecular weight materials with the attended amide formation followed by driving the reaction to completion at higher temperature, resulting in formation of imidazoline ring if the amine reactant employed so permits. The present reaction is preferably conducted until no more water is evolved and no more condensate is produced by stripping at reduced pressure, for example about 2 to about 30 millimeters of mercury.

Use of lower aliphatic esters, e.g., dimethyl azelate and methyl benzoate in the above reactions permit the use of temperatures as low as 70° C. when the reaction is conducted in the presence of an alkaline catalyst such as soda amide or sodium methylate.

It will, of course, be understood that higher temperatures will result in a shorter reaction time. In general, however, a time as short as 1 hour may be used. In practice, a time of from about 2 hours to about 6 hours is employed, with up to 18 hours being permissible.

When the two-step heating process of amidation followed by imidazoline ring formation is employed, it is the usual practice to heat the mixture initially for about 1 to 2 hours at about 120 to 140° C. and then increase the temperature to about 165 to 180° C. for about 2 to 4 additional hours.

The following examples are presented for the purpose of illustration only and are not to be construed as limiting the present invention.

EXAMPLE I

One hundred-eighty grams of anhydrous ethylene diamine (3 moles), 303 grams of sebacic acid (1.5 moles) and 366 grams of benzoic acid (3 moles) were placed in a 2-liter stirred autoclave and heated to 108° C. The reaction was allowed to proceed for a period of 2 and one-half hours during which time the pressure rose to 320 p.s.i. The autoclave was then evacuated to remove water vapor and drive the amidation reaction to completion.

The resultant product was a quite viscous amber fluid at room temperature which, when added to water, produced a minor amount of foam which was very fragile. The material lowered the surface tension of its aqueous solutions but was itself only very slightly soluble. Presence of small amounts of acid increased the solubility to some extent. However, foaming was maintained at a minimum value.

EXAMPLE II

A mixture of 366 grams of benzoic acid (3 moles), 376 grams azelaic acid (2 moles) and 259 grams of 1,3-diamino propane (3.5 moles) were reacted in the manner described in Example I.

The material thus formed was a viscous, sparingly soluble surface active agent exhibiting very low foaming properties. It reduced the foam present in a 1% solution of nonyl phenoxy polyethylene oxyethanol, a conventional high foaming nonionic syndet.

EXAMPLE III

A mixture of 366 grams of benzoic acid (3 moles), 448 grams of adipic acid (3 moles) and 459 grams of pentamethylene diamine (4.5 moles) were reacted by the procedure of Example I. The material thus formed was a viscous, sparingly soluble, surface active liquid similar to Examples I and II.

EXAMPLE IV

A mixture of 147 grams of maleic anhydride (1.5 moles), 408 grams of toluic acid (3 moles) and 438 grams of triethylene tetramine were reacted by the procedure of Example I. This condensate was more soluble, especially in acid media, than the other materials, but lacked the high surface activity characteristic of other similar materials.

EXAMPLE V

A mixture of 25 grams of naphthenic acid (1 mole), 376 grams azelaic acid (2 moles) and 196 grams of N,N-bis (3 aminopropyl) amine (1.5 moles) was placed in a tared 1 liter, 3 neck flask, and the temperature was raised to 130° C. at atmospheric pressure. The reaction was continued for a 3-hour period during which 35 milliliters of water were collected in a side arm condensate collector. The temperature was then raised to 185° C. at one atmosphere for 3 hours and an additional 27 milliliters of water containing 0.23 equivalents of titrable amine were collected in a side arm collector. An additional 10 milliliters of liquid were collected after the material was stripped by lowering the pressure to 10 millimeters of mercury at a temperature of 175° C. for a 15-minute period.

EXAMPLE VI

A mixture of 438 grams of p-isopropyl benzoic acid (3 moles), 208 grams N-amino ethyl ethanolamine (2 moles) and 149 grams of adipic acid (3 moles) were reacted for 6 hours at a temperature of 150° C. The material was then passed to a stripping operation in a molecular still at a pressure of 5 millimeters of mercury and a surface temperature of 220° C. within the still.

The materials resulting from both examples were found to be efficient fume depressants in acid pickling baths.

Obviously, many modifications and variations of the invention as hereinbefore set forth may be made without departing from the spirit and scope thereof, and, therefore, only such limitations should be imposed as are indicated in the appended claims.

I claim:

1. A process for preparing a surface active agent comprising: mixing together an aliphatic alkyl or alkenyl dibasic carboxylic acid having from 2 to 10 carbon atoms, a benzene monocarboxylic acid which may be alkyl substituted, and a diacylatable reactant selected from the group consisting of aliphatic alkyl diamines having from 2–6 carbon atoms, monoalkanolamines having from 2–6 carbon atoms and alkyl polyamines having 2 primary amino groups and up to two secondary amino groups, the total number of carbon atoms present in the dibasic acid plus the diacylatable reactant being in the range of 4 to 18 inclusive; and heating the resulting mixtures for at least about 1 hour at a temperature of above about 70° C.

2. The process of claim 1, wherein the mixture is initially heated at about 120–140° C. for about 1–2 hours followed by heating at 165–180° C. for about 1–4 hours.

3. The process of claim 1, wherein the dibasic acid is selected from the group consisting of sebacic, maleic and adipic.

4. The process of claim 1, wherein the diacylatable reactant is selected from the group consisting of ethylene diamine, propylene diamine, diethylene triamine and monoethanolamine.

5. The process of claim 1, wherein the mixture is subjected to a vacuum during said heating.

6. The process of claim 1, wherein the total number of carbon atoms in the dibasic acid and acylatable reactant is from 6 to about 12.

7. The process of claim 1, wherein the ratio of aromatic carboxylic acid to dibasic acid is from about 1:0.5 to about 1:6.

8. The process of claim 1, wherein the molar ratio of acylatable reactant to dibasic acid is approximately 1:1.

9. The surface active compounds prepared by the process of claim 1.

References Cited

UNITED STATES PATENTS 3,284,500  11/1966  Tieman _____ 260—561

JAMES A. PATTEN, Primary Examiner

EDWARD J. GLEIMAN, Assistant Examiner

U.S. Cl. X.R.

260—468, 469, 476, 558, 309.6 485; 252—356, 357